Figure 1:
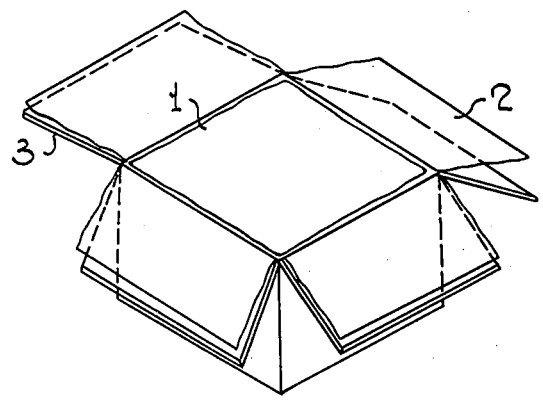

Sept. 11, 1956  W. J. SPARKS ET AL  2,762,504
PACKAGING TACKY HYDROCARBON POLYMERS IN POLYETHYLENE FILM
Original Filed March 24, 1945

William J. Sparks
Francis P. Baldwin   Inventors
Raymond G. Newberg
By W. H. Smyers   Attorney

United States Patent Office 2,762,504
Patented Sept. 11, 1956

2,762,504

PACKAGING TACKY HYDROCARBON POLYMERS IN POLYETHYLENE FILM

William J. Sparks, Westfield, and Raymond G. Newberg, Roselle Park, N. J., and Francis P. Baldwin, South Bend, Ind., assignors to Esso Research and Engineering Company, a corporation of Delaware Application October 10, 1951, Serial No. 250,688

8 Claims. (Cl. 206—84)

This invention relates to a new article of manufacture and methods of making same, and more particularly, it relates to novel and improved methods of packaging plastic materials which are tacky and have substantial cold-flowing tendencies. One particularly important application of the invention is in packaging the synthetic rubber known under the trademark "Butyl" rubber made by the low-temperature copolymerization of isobutylene with a small amount of a diolefin.

The synthetic rubber referred to above as "Butyl" rubber may be prepared as described in Australian Patent 112,875 and in U. S. Patent 2,356,128, and is the type of synthetic rubber manufactured commercially and sold under the government identification "GR-I."

Although the details of the preparation of such synthetic rubber do not constitute a part of this invention, it may be noted for the sake of general reference, that such preparation comprises essentially reacting together isobutylene with a low molecular weight aliphatic conjugated diolefin such as isoprene or butadine, in the presence of a dissolved metal halide Friedel-Crafts catalyst at a temperature below —50° C. A preferred catalyst is made by dissolving aluminum chloride in ethyl chloride at room temperature and then cooling the solution down to the desired copolymerization temperature. The reaction is preferably carried out in the presence of a diluent-refrigerant such as liquid ethylene, and preferably at a temperature ranging from about —80° C. to —103° C., the boiling point of liquid ethylene. The proportions of reactants may vary to some extent, chiefly according to the type of diolefin used; for instance, the proportion of isobutylene should be about 70 to 99.5% by weight and the amount of diolefin should be about 5 to 30% in the case of butadiene or about 0.5% to 10% in the case of isoprene.

The synthetic rubber produced by the above described process is an elastic branched chain linear aliphatic hydrocarbon copolymer having a molecular weight ranging from about 10,000 upward to 100,000 or more and having a slight unsaturation indicated by an iodine number ranging from about 1 to 20, preferably about 2 to 10, and convertible with sulfur or other suitable vulcanizing or curing agent into a product of decreased plasticity, increased elasticity and tensile strength. In the cured or vulcanized condition, this synthetic rubber has no undesirable tacky or cold-flowing properties, but a serious problem is presented to the rubber industry by the necessity of packaging the raw (i. e. unvulcanized) rubber for shipment from the manufacturing plant to the factories where the raw synthetic rubber is to be compounded with curing agents and other materials as desired, shaped into the desired articles such as inner tubes for tires for autos, airplanes, etc., and then vulcanized.

Because of the tackiness of this raw synthetic rubber stock, it sticks to any of the conventional packaging materials such as paper bags, cardboard boxes or metal containers, in fact so tightly that its removal from such containers requires very time-consuming, drastic procedures.

This tackiness problem is particularly serious with raw synthetic rubber of the type described having a Mooney number between approximate limits of 10 to 100, which may be considered as roughly equivalent to a molecular weight of about 15,000 or 17,000 to about 100,000. The Mooney test is applied by heating the plastic material in question to 100° C., subjecting it to pressure and measuring the resistance to flow or deformation, the higher the Mooney number, the tougher the material. It should be noted that the GR-I specification calls for a Mooney number of 40 to 50.

One object of the present invention is to package this synthetic rubber and other tacky materials with a film of wrapping material which will prevent the tacky material from sticking to the paper or metal container in which it is stored or shipped. Another object of the invention is to provide a packaging material which is physically and chemically compatible with the synthetic rubber or other tacky wrapped material so that after storage and shipment, or at any desired time, the wrapper film which is used to prevent the tacky material from sticking to the outer container may be homogeneously mixed into the synthetic rubber or other tacky material without deleteriously affecting the desirable properties of the latter. These and other objects and advantages of the invention will be apparent to those skilled in the art from the following specification, particularly when read in conjunction with the accompanying drawing.

Broadly the invention comprises wrapping the unvulcanized synthetic rubber or other tacky material in a thin, flexible, continuous, self-sustaining sheet or film of a substance capable of forming a homogeneous mixture therewith.

One suitable wrapping material is a synthetic copolymer of an aliphatic olefin such as isobutylene and a polymerizable cyclic compound such as styrene.

A general method of preparing such copolymers is described in U. S. Patent 2,274,749, and this consists in copolymerizing the reactants at a temperature below 0° C. in the presence of an active halide polymerization catalyst such as boron fluoride or aluminum chloride, with or without the use of a diluent-refrigerant such as liquid propane, etc., and using proportions of reactants which may vary over a broad range according to desired hardness, melting point, plasticity, etc. However, for the particular purposes of the present invention, this copolymer must be prepared under certain relatively narrow conditions. The proportion of aliphatic olefin such as isobutylene used in the copolymerization should be about 40 to 70% by weight, preferably about 45 to 60% by weight, while the proportion of polymerizable cyclic compound such as styrene, should be about 35 to 60%, preferably about 40 to 55% by weight, and best results are obtained with even the still narrower range of 45 to 50% by weight.

The copolymerization should be carried out at a temperature below —50° C., preferably below —80° C., such low temperatures being obtained by either internal or external refrigeration.

By thus restricting the proportions of reactants and the copolymerization temperature, high molecular weight copolymers are obtained which have an intrinsic viscosity above 0.5, and preferably 0.8 or 0.9 or higher. These copolymers are thermoplastic solids which have sufficient flexibility and toughness particularly in the heat-softened condition, to permit ready rolling out into thin sheets or films on suitable equipment such as the conventional calender used in rubber processing.

For convenience and brevity the above-described copolymer of a cyclic polymerizable material and an olefin or alkene will be referred to as a cycalkene copolymer, or more simply a cycalkene. The specific type of copolymer made from styrene and isobutylene will similarly be referred to as simply stybutene. The invention will be illustrated as applied particularly to stybutene, although it is not to be limited thereto.

Many resinous and plastic materials either occurring in nature or made synthetically heretofore are unsuitable for sheeting out into thin self-supporting films because they are either too brittle or have too much cold flow, etc., and furthermore, most of the plastics which can be successfully sheeted out into thin self-supporting films are unsatisfactory for the purposes of the present invention, either because they are not physically and chemically compatible with the synthetic rubber type or plastic intended to be wrapped, and therefore, could not be homogeneously milled into such material, or else because they themselves have too much cold flow and tackiness.

For preparing self-supporting films of stybutene for use as a wrapper according to this invention, the stybutene, having a high intrinsic viscosity as mentioned above, should be heated well above the softening point, for instance, to a temperature of about 100–180° C., preferably in a kneader type mixer to bring the entire mass to a uniform temperature and plasticity, and then it is sheeted out into a thin film by processing on a rubber calender. In this latter operation a three roll calender may be employed. The center roll is heated to about 220° F. The top roll is maintained at a temperature between 250° and 300° F. The bottom roll is maintained at a temperature of about 80° F. The film is stripped from the middle roll and allowed to cool on the bottom roll then subsequently rolled automatically on a mandrel. The sheet may then be slit or cut to size depending on the application requirements. These thin sheets of stybutene, or polyethylene may also be made by extrusion, preferably using a plastic extruder, with a temperature of about 300 to 450° F.

In preparing the stybutene film, or the film of other material to be used as wrapper, one may add small amounts of other materials to the plastic mass before sheeting it out into film form, as for instance, small amounts of soluble coloring agents such as blue, red, yellow, green, or other colored dyes, preferably of the oil-soluble type, colorless, light absorbing substances such as quinine, aesculin, etc. to protect the synthetic rubber or plastic wrapped in the film from the harmful effect of sunlight, ultraviolet light, etc., during storage or shipment, or pigments or other powdered fillers may be added. Small amounts of plasticizers or calendering aids may be used, or other resinous or plastic materials which may be used to slightly modify the physical characteristics of the stybutene film without greatly affecting the chemical properties thereof or without adversely affecting its compatibility with the synthetic rubber or other plastic intended to be wrapped therein. Examples of such various additives, which may be used in proportions of 1 to 5% or more, include high molecular weight polybutene (preferably 30,000 to 300,000 molecular weight Staudinger), isobutylene-polyolefin low-temperature copolymers (preferably 30,000 to 150,000 molecular weight Staudinger), isobutylene-polyolefin-styrene tripolymers (preferably 10,000 to 100,000 molecular weight Staudinger), high molecular weight sulfurized alkylated phenol $HO(R)C_6H_3 \cdot 2S$, paraffin wax, high melting point deoiled petrolatum, vegetable waxes, stearic acid, high molecular weight polymethylpentadiene (30,000 to 40,000 molecular weight Staudinger), high molecular weight polyethylene, deproteinized and deashed or cyclized rubber, cyclized rubber, and aliphatic nitriles that contain 12 to 18 carbon atoms, zinc stearate, zinc oxide, sodium stearate, carbon black, etc.

The stybutene or other thermoplastic film may be prepared in any desired thickness, but for the present invention preferably has a thickness of about .001 inch to .01 inch, or about 1 to 10 mils, and preferably about 2 to 4 mils. After sheeting it out into a thin film by rolling calendering, or any other suitable method, the resulting film is found to have a smooth surface, good strength, good flexibility, low permeability to moisture vapor and other gases, low cold flow and little or no surface tack.

In carrying out the invention, it is found that the actual amount of stybutene or other thermoplastic wrapping film necessary for wrapping the raw synthetic rubber or other plastic having cold-flowing tendencies, is relatively very small, ranging for instance, from about 1 to 25 pounds, preferably about 2 to 10 pounds per ton of synthetic rubber, the latter preferably being packaged in box-shaped chunks weighing about 25 to 100 pounds, preferably about 50 pounds each. If chunks of raw synthetic rubber weighing about 50 pounds each are wrapped with a stybutene film having a thickness of about 2 mils, the total amount of stybutene required for the wrapping will be about 4 pounds per ton of rubber, which amounts to about 0.2% of stybutene by weight. Thinner films can be used with smaller weights of synthetic rubber, and conversely thicker films should be used with relatively larger packages of synthetic rubber or other plastic.

For some purposes, such as short time storage and transportation over short distances or requiring only a short time, the plastic having cold-flowing tendencies and wrapped up in the thin film of stybutene or other cycalkene copolymer having requisite tensile strength, toughness and nontackiness, may be used as such i. e., without being placed in any outer container or wrapped in outer wrapping material. But, to keep the materials clean, it is preferred to use an outer container such as a corrugated paper carton, paper or cloth bag, large tin can, drum, etc., or for some purposes where the packages are less subject to mechanical injury from bumping solid objects, etc., it may be sufficient to cover the stybutene-wrapped synthetic rubber or other plastic with ordinary heavy wrapping paper, such as the kraft paper commonly used for wrapping purposes, such wrapping being chiefly for the purpose of keeping the inner package clean.

Instead of using a non-tacky stybutene or other cycalkene copolymer as wrapping film, other thin, non-tacky, flexible, tough and self-sustaining, non-metallic sheet material may be used, especially hydrocarbon polymers of the aliphatic type, e. g., polyethylene, polyisobutylene having a mol. wt. of about about 200,000 (Staudinger method), non-tacky synthetic rubbers, etc., and mixtures thereof, especially mixtures of polyethylene with a minor amount of polyisobutylene or of isobutylene-diolefin rubber.

Although the invention has been described above as particularly applied to the wrapping and packaging of a raw synthetic rubber particularly of the copolymerized isobutylene-diolefin type, it may also be applied to other tacky plastics having cold-flowing characteristics such as tacky unsaturated synthetic rubber, polybutene having an average molecular weight between the approximate limits of 20,000 to 200,000 by the Staudinger method, or other high polymeric compounds comprising isobutylene, such as copolymers of isobutylene and ethylene, copolymers of styrene and isobutylene of low styrene content and sufficiently low molecular weight to be tacky and have cold-flowing properties, such as those having a styrene content of less than about 50% and having an intrinsic viscosity of about 0.1 to about 0.4, with an average molecular weight of about 3,000 to 30,000.

The following table will illustrate a number of suitable combinations of various tacky cold-flowing plastics and various wrappers compatible therewith upon subsequent hot mixing:

| Non-tacky Film | Plastic Material Packaged | | |
| --- | --- | --- | --- |
|  | Butyl Rubber | Polyisobutylene | Buna S |
| Stybutene | Yes | Yes | Yes. |
| Polyethylene | Yes | Yes | Yes. |

It will be noted that in all of these cases the stybutene or other cycalkene copolymer or other non-tacky film used as wrapper is at least physically compatible with the tacky plastic wrapped so that it may be homogeneously admixed therewith by simple milling or kneading at heat softening temperature, and in most cases, such wrapper is sufficiently closely related from a chemical point of view that it will have no adverse effect on the chemical properties of the wrapped plastic, and in some instances, may even effect a slight improvement in physical or chemical properties thereof, e. g., by reducing moisture vapor penetration, etc.

When using a polyethylene film as the wrapping material according to this invention, the polyethylene may have a molecular weight over a fairly broad range, such as about 10,000 to 50,000, and preferably about 15,000 to 20,000. The melting point of polyethylene varies slightly according to the molecular weight, but is in the general range of about 95 to 110° C., usually in the vicinity of 105° C. Therefore, when a polyethylene film is used as a wrapper for packaging a tacky synthetic rubber type plastic, e. g. an isobutylenediolefin or GR–I synthetic rubber or a GR–S (e. g. 75% butadiene, 25% styrene) synthetic rubber, after storage and/or shipment, the synthetic rubber and surrounding polyethylene wrapper should then be mixed together by hot milling at a temperature slightly above the melting point of the polyethylene, for instance at 220–300° F., or preferably at about 220–250° F. This will insure good mixing.

Figures 2, 3:
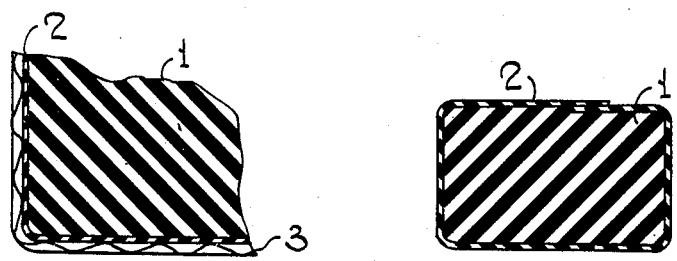

The invention is illustrated in the accompanying drawing in which Figure 1 represents a perspective view of an open corrugated paper carton containing a large chunk of plastic such as raw synthetic rubber of the low-temperature isobutylene-diolefin copolymer type wrapped, except for the open top, in a thin sheet or film of polyethylene copolymer, the Figure 2 shows an enlarged section of one of the lower corners of the package shown in Figure 1, and Figure 3 is a cross section of a package of plastic such as synthetic rubber merely wrapped in a thin film of polyethylene without any outer container or wrapper. In the several figures, like reference numerals represent like parts.

Referring to Figure 1 of the drawing, a large piece or chunk of tacky plastic 1, e. g., raw synthetic rubber of the GR–I type is shown as wrapped in a thin film of polyethylene 2, the top of the package being illustrated open for convenient understanding of the invention, the wrapped tacky plastic being shown as placed in an outer container 3 such as a corrugated paper carton, also shown open to permit seeing the contents thereof. It is understood, of course, that for storage and shipment, the upper flaps of the wrapper 2 will be folded down over the surface of the plastic 1, and then the lids of the carton 3 will be closed in the conventional manner.

In Figure 2, which represents a much enlarged vertical section through one of the lower corners of the package shown in Figure 1, the plastic 1 is shown as tightly pressing against the surrounding thin film or sheet of polyethylene 2, which in turn presses tightly on the bottom of the outer container 3 e. g., a corrugated carton. The plastic 1 and surrounding wrapper 2 may or may not press tightly against the side walls and in the bottom corners of the container 3 when first packaged, although during storage and during shipment when the package is subjected to substantial vibration, the plastic 1 tends to flow into the bottom corners and against the side walls of the container 3, thereby stretching the thin, tough, but slightly elastic film 2. However, it is found that even after shipment or after substantial storage, when the container 3 is opened for removing its contents, the plastic 1 surrounded by its wrapper 2 will not substantially adhere to the inner surface of the container 3, and can readily be removed without difficulty and in a clean condition.

Figure 3 is a vertical section of a package similar to that shown in Figure 1 except that the plastic 1 is shown merely wrapped in a thin film of polyethylene 2 without any outer container such as shown in Figures 1 and 2.

The advantages of the invention will be better understood from a consideration of the following specific examples.

*Example 1*

A 50 pound sample of GR–I raw synthetic rubber which had been causing great difficulty by sticking to paper bags and cardboard boxes during shipment, was wrapped in a film having a thickness of about two mils of a stybutene having a combined styrene content of about 60%, and an intrinsic viscosity of 0.75, which had been made by copolymerizing styrene and isobutylene at $-103°$ C., using as a catalyst a 0.5% by weight solution of $AlCl_3$ in methyl chloride, and using 3 volumes of $CH_3Cl$ as diluent per volume of mixed reactants, and the resulting stybutene-wrapped raw synthetic rubber was placed in a 50 pound corrugated carton, and shipped railway express over a distance of about 3,000 miles. At the end of the trip, the container was opened and when held upside down, the stybutene-wrapped rubber fell out of the box, thus showing that the stybutene wrapper satisfactorily prevented the GR–I rubber from sticking to the corrugated paper carton.

However, when the stybutene-wrapped rubber was milled in order to mix the stybutene into the rubber, the temperature of the rolls had to be raised to about 180° F. in order to obtain homogeneous mixing, and this temperature is slightly higher than desirable, thus indicating that a stybutene of 60% styrene content is just about at the upper limit of the suitable range of styrene content for compatibility, and that better results would be obtained with slightly lower styrene content.

*Example 2*

A similar test was made with a stybutene having a combined styrene content of 50% and prepared under substantially identical copolymerization conditions, and this film was found to be satisfactory both in regard to preventing the GR–I rubber from sticking to the inside of paper cartons as well as to iron cans, and also was compatible with the GR–I and gave a homogeneous mixing at the usual milling temperature of about 130° F.

*Example 3*

Another test was made similar to Example 2, except that a stybutene was used which had a combined styrene content of about 45% and which contained about 2% of zinc stearate as a plasticizing agent or milling aid to prevent sticking of the film to the heated rolls during the sheeting of the film. This stybutene film having a thickness of about 2 to 3 mils was found very satisfactory in preventing a GR–I raw synthetic rubber from sticking to corrugated paper cartons during shipment, and was also found to be readily compatible with the GR–1 at ordinary mixing temperatures, i. e., about 110 to 140° F. The compatibility was determined by mixing 5% of EPC (easy processing channel) carbon black with the stybutene to give the latter a distinctive color for tracing the stybutene while dispersing it in the GR–I rubber. Then 150 gms. of the GR–I rubber were placed on a cold tight mill with a roll temperature of about 130° F., and 3 gms. of the blackened stybutene were milled in to the GR–I rubber. After cutting from each side of the mill four times, the dispersion was complete and no flakes of stybutene were in evidence in the synthetic rubber.

*Example 4*

Another packaging and mixing test was made by using as a wrapper film having a thickness of about two mils made of a mixture of 75% of a stybutene having a combined styrene content of about 60% and containing 2% of zinc stearate, with about 25% by weight of a polybutene having an average molecular weight of about 260,000. About 5% by weight of EPC carbon black was also used for imparting a distinctive color to the stybutene film. This mixture of stybutene and polybutene was readily calendered into a smooth self-supporting film and was found to be satisfactory for preventing the raw GR–I synthetic rubber from sticking to paper carton containers and was also found readily compatible with the GR–I when mixed at an ordinary milling temperature of 110° F.

*Example 5*

This example demonstrates how tenaciously tacky Butyl rubber (GR–I) sticks in cardboard containers, and that an interior coating of wax in the container will not prevent the sticking; and finally, as in the present invention, that Butyl rubber wrapped in a thin film of polyethylene, can readily be removed from such cardboard containers.

The Butyl rubber used was regular commercial GR–I (olefin-diolefin) synthetic rubber, a copolymer of 97% isobutylene and 3% isoprene, having a Mooney value of 40 to 50, (as currently used in manufacturing most automobile inner tubes).

The cardboard containers used were pint-sized cylindrical containers not having any waxing or other treatment on their inner surface to prevent sticking of contents thereto. The one container which was waxed for this demonstration, was coated by brushing the inside with hot molten paraffin wax having a temperature of about 250° F., and then cooled. This represents a frequently used prior art anti-sticking type of coating. The other two containers were not coated at all.

To fill the containers about half full with Butyl rubber, blocks of Butyl rubber were cut as nearly as possible to the desired shape and size (about ½ pint), but slightly smaller in order to get them into the container without difficulty. One piece of Butyl was placed in the container marked "nothing" (meaning no treatment of any sort), and one piece was placed in the wax-lined container. The other piece of Butyl rubber was wrapped, according to the present invention, in a "thin, tough, flexible self-supporting film of a substance which is miscible with rubber," in this case specifically a commercially available polyethylene film of about 2 mils thickness, and then placed in the other container.

When all three containers were ready, with the Butyl rubber in each, they were placed in an oven at 120° F. for one week, the Butyl rubber in each container being loaded with a weight of about 1 lb./sq. in., in order to give an accelerated storage test. This is to simulate the storage of regular commercial 50 lb. packages of Butyl rubber. The heavier the weight and the higher the temperature, the greater is the tendency of the Butyl rubber to "flow" slowly into the fibrous surface of the cardboard container.

After the one week, the samples were removed from the oven, the loads were removed, and the samples were permitted to cool to room temperature.

It was then found that the Butyl in the plain cardboard container, as well as in the wax-lined container, was stuck so tightly that its was impossible to remove the Butyl rubber from the containers. On the other hand, the sample of Butyl rubber wrapped in the polyethylene film could both be removed readily from the cardboard container.

In commercial practice, the thin film of the polyethylene, sticking to the Butyl rubber, is hot milled into the latter when it is compounded with carbon black, sulfur, etc. This could not be done if the Butyl rubber were wrapped in paper, waxed paper, or cellophane, or any other materials heretofore available for wrapping purposes.

*Example 6*

Another laboratory test consisted in wrapping an approximately cubical shaped piece of commercial GR–I rubber (4" x 4" x 6") in a film of polyethylene of about 2 mils thickness and of about 20,000 molecular weight. This cube wrapped in polyethylene was then put into a cardboard box and placed in an oven at 150° F. and tested every week or so for adhesion of the package to the cardboard box. Even up to 7 weeks, when the test was discontinued, the package of GR–I rubber wrapped in polyethylene could still be removed readily from the cardboard box without any adhesion. On the other hand, experience had shown that similar GR–I rubber alone would penetrate into the fibers of the cardboard container and adhere so tenaciously that it could not be removed from the box without cutting away the container with some of the rubber sticking to it.

*Example 7*

About 50 pounds of polyisobutylene having a Staudinger molecular weight of about 80,000, was wrapped in a polyethylene film and stored in a cardboard carton. After six months, the polyisobutylene wrapped in polyethylene could be removed readily from the cardboard container without sticking. When ready for use, the thin polyethylene wrapping film is milled into the polyisobutylene and makes a homogeneous composition, containing only a fraction of a percent by weight of polyethylene.

*Example 8*

A storage test, similar to Example 7, was made with polyisobutylene having an average molecular weight of about 150,000, wrapped in a film of polyethylene. After six months' storage, the package showed no sticking to the cardboard container.

*Example 9*

Some guayule rubber, which is a very tacky variety of natural rubber, was wrapped in a polyethylene film and stored for a number of weeks, in a cardboard container. When tested periodically, the polyethylene-wrapped guayule package could always be removed readily from the cardboard container without sticking.

*Example 10*

A rectangular solid (2⅝" x 4⅝" in area, and 3½" thick) of standard GR–S (75% butadiene and 25% styrene) synthetic rubber was wrapped in a 2 mil film of polyethylene (commercial film of about 20,000 molecular weight) and stored in a cardboard carton, with a floating lid loaded with a dead weight of ½ lb. per square inch, and stored at 158° F. for 24 hours, in an oven. When removed from the oven, the polyethylene-wrapped synthetic rubber showed no signs of sticking to the cardboard container or lid. Also, it was observed that the polyethylene film could even be removed from the GR–S synthetic rubber. After the storage test, the polyethylene film and the GR–S synthetic rubber were milled together and found to make a homogeneous mixture.

*Examples 11, 12 and 13*

Tests similar to the one carried out in Example 10 were made on three more recently developed varieties of GR–S type of synthetic rubber. One is a product referred to as "Polysar-Krynol"; it is a blend of GR–S synthetic rubber with a high concentration of oil plasticizer.

Another variety was a GR–S–X–632, which is a copolymer of 95% butadiene and only 5% of styrene, and is particularly adapted for the manufacture of inner tubes.

The third variety was a GR–S–X–485; this is the material commonly referred to as the recently developed "cold rubber," meaning that it is made by the same general emulsion polymerization technique but at a colder temperature, e. g. 0° C. to 20° C. or so, instead of the previously used range of about 30 to 50° C.

All three of these different types of GR–S synthetic rubber were wrapped in a film of polyethylene and stored in a cardboard container under the same test conditions as described in Example 10. In each case, at the end of the 24 hour test, when removed from the oven, the polyethylene-wrapped synthetic rubber could be easily removed from the cardboard carton without sticking. As in the case of the standard GR–S, each of these modified types of GR–S could also be separated from the polyethylene wrapping film, but in each case when the film was actually compounded into the rubber, a homogeneous composition resulted.

The invention is particularly applicable to tacky hydrocarbon polymers having a Mooney value below 40, and also to the plasticized synthetic rubbers, having for instance 20 to 50% oil compounded therewith.

*Example 14*

As a semi-commercial test of the invention, a dozen 50-pound packages of GR–I (isobutylene-isoprene) synthetic rubber were each wrapped in a film of polyethylene of about 2 mil thickness, and placed in a corrugated cardboard carton. They were then shipped from Louisiana to New York and back. Upon opening the packages, it was found that they all could be emptied without any sticking. In other words, the polyethylene-wrapped GR–I synthetic rubber did not stick to the corrugated cardboard containers.

*Example 15*

Substantially the same type of test as described in Example 14 was repeated on a larger commercial scale by shipping a whole carload of 50-pound packages of GR–I synthetic rubber, each wrapped in a film of polyethylene and placed in a corrugated cardboard container. This carload was shipped from Louisiana to Akron, Ohio, and no difficulty was found in emptying the polyethylene-wrapped GR–I synthetic rubber from the corrugated cardboard containers.

Instead of actually wrapping the raw synthetic rubber or other cold-flowing plastic in the stybutene or other film and then placing the resulting package in an outer cardboard, paper, cloth, wood or metal container, the stybutene film can first be placed in the empty container and then the cold-flowing plastic can be inserted.

Although it is preferred to use films, it is possible to apply the coating to the plastic material to be packaged, in other ways. This is especially true when the plastic packaged is in the form of a bale or block which is the shape of the package to be used. Alternate methods of applying the exterior coating include application of a solution of the stybutene or other protective film by spraying, brushing or dipping followed by an evaporation of the solvent. Instead of a solution of the stybutene an aqueous dispersion thereof can be used and applied in a like manner. When using solution or aqueous dispersion, fillers may also be used such as zinc stearate, carbon black, etc.

This application is a continuation-in-part of application Serial No. 584,622 filed March 24, 1945, now Patent 2,572,959.

It is not intended that this invention be limited to the specific examples or modifications which have been described merely for the sake of illustration, but only by the appended claims in which it is intended to claim all novelty inherent in the invention, as well as all modifications coming within the scope and spirit of the invention.

What is claimed is:

1. The method of packaging a low-temperature isobutylene-diolefin copolymer having tacky, cold-flowing characteristics, which comprises wrapping it in a thin, flexible, continuous, self-sustaining film of polyethylene.

2. The method of packaging a raw synthetic rubber of the low-temperature isobutylene-diolefin type having a Mooney number of about 10 to 50, which comprises wrapping it in a thin, continuous self-sustaining film of polyethylene, and placing it in a paper carton for shipment and/or storage.

3. A package comprising a substantially rigid container, substantially filled with unvulcanized rubber of the low-temperature isobutylene-isoprene type having a Mooney number of about 10 to 50 and having an iodine number of about 2 to 10, said synthetic rubber being separated from said container by a thin film of about 1 to 2 mils in thickness of polyethylene.

4. A package comprising unvulcanized synthetic rubber of the low-temperature isobutylene-isoprene type having a Mooney number of about 10 to 50 and an iodine number of about 1 to 20, wrapped in a film of about 1 to 2 mils in thickness of polyethylene.

5. A package comprising a container having therein a plastic having tacky cold flowing characteristics, said plastic being unvulcanized synthetic rubber of the low-temperature isobutylene-isoprene type having a Mooney number of about 10 to 50, and an iodine number of about 1 to 20, said container and plastic being separated by a thin, continuous, flexible, self-sustaining film of polyethylene homogeneously miscible therewith.

6. A package comprising a container having therein a plastic having tacky, cold flowing characteristics, said plastic being a hydrocarbon polymer selected from the group consisting of polybutene having an average molecular weight of about 12,000 to 500,000, unvulcanized isobutylene-diolefin synthetic rubber, and GR–S synthetic rubber, said container and plastic being separated by a thin, continuous, flexible, self-sustaining film of polyethylene homogeneously miscible therewith.

7. A package comprising GR–S synthetic rubber wrapped in a thin, flexible, continuous, self-sustaining film of polyethylene.

8. A package comprising polybutene having an average molecular weight of about 12,000 to 500,000, wrapped in a thin, flexible, continuous, self-sustaining film of polyethylene.

References Cited in the file of this patent

UNITED STATES PATENTS

| | | |
|---|---|---|
| 1,607,626 | Hopkinson | Nov. 23, 1926 |
| 2,383,839 | Beekley | Aug. 28, 1945 |
| 2,541,498 | Calvert | Feb. 13, 1951 |

FOREIGN PATENTS

| | | |
|---|---|---|
| 567,360 | Great Britain | Feb. 12, 1945 |